(12) United States Patent
Holzman et al.

(10) Patent No.: US 6,885,306 B2
(45) Date of Patent: Apr. 26, 2005

(54) CAPACITIVE SENSING MONITOR AND METHOD THEREFORE

(75) Inventors: Louis M. Holzman, St. Paul, MN (US); Thomas J. Batcher, Mendota Heights, MN (US)

(73) Assignee: Ecolab Inc., Mendota Heights, MN (US)

( * ) Notice: Subject to any disclaimer, the term of this patent is extended or adjusted under 35 U.S.C. 154(b) by 79 days.

(21) Appl. No.: 10/644,452

(22) Filed: Aug. 20, 2003

(65) Prior Publication Data

US 2005/0040958 A1 Feb. 24, 2005

(51) Int. Cl.$^7$ .............................................. G08B 21/00
(52) U.S. Cl. ........................ 340/606; 340/612; 340/618
(58) Field of Search ................................ 340/606, 603, 340/605, 610, 612, 618; 73/54.05, 861.351

(56) References Cited

U.S. PATENT DOCUMENTS

| | | | |
|---|---|---|---|
| 4,468,170 A | | 8/1984 | Hanset |
| 4,480,467 A | * | 11/1984 | Harter et al. ............. 73/204.15 |
| 4,607,254 A | * | 8/1986 | Carlson ....................... 340/606 |
| 5,975,352 A | | 11/1999 | Spriggs et al. ................. 222/23 |
| 5,986,554 A | | 11/1999 | Furber et al. ................ 340/623 |
| 6,799,474 B1 | * | 10/2004 | Brown et al. ............ 73/861.15 |
| 2002/0118025 A1 | | 8/2002 | Yamagishi et al. |

FOREIGN PATENT DOCUMENTS

| | | |
|---|---|---|
| FR | 2 769 094 | 4/1999 |
| GB | 1 079 971 | 8/1967 |
| WO | WO 03/055538 | 7/2003 |

OTHER PUBLICATIONS

Quantum Research Group, "QProx™ Applications", 2003, on–line pages.
Quantum Research Group, "Level Sensing Applications", 2003, on–line pages.
Quantum Research Group, "QProx™ QT114, Charge–Transfer QLevel Sensor IC", 1999 Brochure.
Turck, Inc., "Capacitive Sensors, QF5.5", pp. 19–20 and 69–70.
Turck GmbH & Co., "Capacitive sensor with preset sensitivity", 1999.
Turck, Inc., Example Applications, p. 12.
Turck, Inc., "Sense through objects with accuracy", p. 2.
Entegris, Inc., "Espy Sensing Products" brochure, 2000, on–line p. 5.

* cited by examiner

Primary Examiner—Toan N. Pham
(74) Attorney, Agent, or Firm—Merchant & Gould P.C.

(57) ABSTRACT

A monitor for monitoring presence or absence of a liquid product in a system for pumping the liquid product from a supply through tubing. A capacitive sensor is coupled to the outside of the tubing at a sensing location having an inlet and an outlet, the capacitive sensor being responsive to the presence or absence of the liquid product in the tubing. The tubing is selected from a material and having an inside diameter at the sensing location selected such that the tubing is substantially evacuated or substantially drains when the liquid product is substantially absent from the tubing preceding the sensing location but small enough so that the liquid product can be sensed by the capacitive sensor when the liquid product is substantially present in the supply.

67 Claims, 6 Drawing Sheets

CAPACITIVE SENSING MONITOR AND METHOD THEREFORE

TECHNICAL FIELD

This invention relates to monitors for sensing the presence or absence or flow of a liquid product and, more particularly, to such monitors using a capacitive sensor.

BACKGROUND

There is a need for sensors able to monitor the presence, absence or flow of a liquid product.

In particular, there are many applications in which a liquid product is transported, possibly via a pump, from one location, e.g., a container, to another location where the liquid product is used and where it is important that an indication be made available, as for example, with an alarm, to indicate that such liquid product is either present or absent in the source container or is flowing or has stopped flowing through tubing connecting the supply location with the destination location.

An example of a situation in which it is important is an out-of-product sensor. When available liquid product has been exhausted, the liquid product will no longer be present inside of the tube. This situation would apply to any application in which liquid product is being pumped from a supply, such as a container, through a tube. When the container empties, air is sucked through the tube and the sensor can be triggered, indicating through a visual or audible alarm that the product has been exhausted. A sensor can indicate when a particular product, which is being supplied to a working environment, has run out of stock. A good example of such a situation is where a rinse aid agent is being added to the water of a commercial washer. Another example is where a liquid detergent is being added to the water of a commercial washer. Other situations involving the need for out-of-product sensors are water care situations where softeners and/or conditioners are being added to a supply of water.

For these types of products, it might not be noticed right away when the liquid product is not present. Only after a period of time when performance, e.g., the effectiveness of washing and rinsing, has already begun to suffer, might the out-of-product condition be noticed. By that time, such deleterious effects may well have already begun affecting the quality of the work product, e.g., cleanliness and/or appearance of cleaned dishware and cookware.

Tubing or other conduits typically connect supply and destination locations when it is necessary to transport a liquid product from one location to another location. Typically a pump, e.g., a peristaltic pump, is located between the supply location and the destination location along the tubing connecting the locations. However, a pump is not the only means available to move liquid product from one location to another. For example, in certain circumstances, an aspirator may be used or gravity feed may be used.

Traditional out-of-product sensors have included an ordinary float. A float can operate as a liquid level sensor in a supply tank or source container. This apparatus works similarly to the common gasoline gauge in an automobile indicating the degree of fullness of the gasoline tank and, thus, indicating when the product, in this case gasoline, is about to become "out-of-product." While such float sensors are very common, they have significant disadvantages. First, float sensors are relatively complicated and, hence, relatively costly. Second, the float necessarily actually contacts the fluid being sensed because it floats in the liquid. Thus, the float assembly is subject to contamination by the fluid which may affect the float's operational effectiveness.

An example of a float sensor is disclosed in U.S. Pat. No. 5,986,554, Furber et al, Empty Product Detector, assigned to Ecolab, Inc., St. Paul, Minn., which describes an alarm mechanism signaling the absence of a liquid from a source of aqueous liquid. The alarm mechanism comprises an alarm body having an inlet port and an outlet port. The inlet port is in liquid communication with a use locus. The alarm mechanism additionally comprises a float chamber placed in liquid parallel communication with the inlet port and the outlet port. The float chamber contains a float operably connected to an alarm. The float, when the chamber is filled with fluid, disables the switch from generating a signal. The float, as the chamber is emptied of liquid, reaches a position and is detected energizing the switch to send a "low or empty product" signal. As liquid in the source of liquid is depleted and is no longer available for passage through the body, the body becomes emptied of liquid as the source of pressure removes liquid from the body and particularly from the chamber causing the float to reach a position generating a signal.

Another traditional out-of-product sensor is simply a section of clear tubing. A section of clear tubing can provide a passive out-of-product sensor by providing a visual indication of whether or not a liquid product is present within the tubing. While simple, this passive sensor also suffers from disadvantages. First, the tubing and, hence, the flow of liquid product must be routed to a location at which a user of the liquid product can observe the clear tubing in order to inspect the clear section of tubing for product presence. Second, in many circumstances, it is difficult to easily observe whether or not the product is actually present in the tubing. And third, the clear section of tubing is not an effective alarm. It does not draw attention to itself when an alarm condition occurs. This, again, may not result in the out-of-product condition being noticed as soon as product outage occurs and, hence, detrimental performance occurs.

A similar sensor consisting of a widened section of clear tubing can be used to provide a visual indication of whether or not a liquid product is flowing within the tubing. Typically, the sensor is designed such that air is trapped in the widened section of tubing. When liquid product is flowing, movement of the liquid product may be determined by observing movement of the air trapped in the clear widened section of clear tubing. However, when liquid product is not flowing in the tubing, no movement of the liquid product is visible in the air in the clear tubing. This type of sensor suffers from the same disadvantages of the previous sensor.

Capacitive sensors have been utilized for tank level sensors. A capacitive sensor would be mounted to the outside of a non-conductive tank such that it could sense the presence or absence of a liquid product inside the tank at the particular level at which the capacitive sensor is located. Positioned at the proper level outside of the tank, such capacitive sensors can adequately determine whether the tank contains that level of product or not. However, the capacitive tank sensor can not determine whether or not the fluid product is actually flowing toward the destination.

SUMMARY OF THE INVENTION

Capacitive sensors have also been used on tubing to detect the presence or absence of a liquid material in the tubing.

However, substantial problems exist which must be solved before these systems can work properly. Differing sizes of tubing, with differing tubing materials and with differing characteristics of liquid product all make it difficult for these systems to work properly. First, such a system must ensure that there is enough liquid product in the tubing at the sensing location when, in fact, the liquid product actually exists, e.g., is flowing, in the tubing at the sensing location. Second, such a system must ensure that the liquid product is substantially evacuated from the liquid tubing at the sensing location when, in fact, the liquid product isn't flowing through the tubing or doesn't exist in the source container so that it may flow through the tubing.

The present invention tackles the problem of capacitive sensing of tubing containing difficult liquid products.

Liquid products in combination with certain tubing materials have lower contact angles which tend to coat the inside surface (wall) of the tubing. Coating or wetting the inside surface of the tubing may trick capacitive sensors into sensing the presence of a liquid product even though such liquid product is not being transported through the tubing. This "residual" liquid product, coated to the inside wall of the tubing, can still be sensed by the capacitive sensor resulting in an erroneous reading and a failure detect an "out-of-product" condition.

Further, improperly sized tubing consisting of the wrong material may result in liquid product flowing through the tubing at a rate such that there is not enough liquid product in the tubing at the sensing location at a given point in time for a capacitive sensor to properly sense the presence of the liquid product. This can result if too much air, or too many air bubbles, is drawn into the tubing. The result can be an erroneous "out-of-product" warning when liquid product is actually present in the supply container and flowing through the tubing.

In one embodiment, the present invention provides a monitor for monitoring presence or absence of a liquid product in a system for pumping the liquid product from a supply through a pump and associated tubing to a destination. A capacitive sensor is coupled to the outside of the tubing at a sensing location between the pump and the destination, the capacitive sensor being responsive to the presence or absence of the liquid product in the tubing. The tubing is selected from a material and having an inside diameter at the sensing location selected such that (a) the material of the inside surface of the tubing and the inside diameter of the tubing is large enough such that the liquid product is substantially evacuated from the tubing at the sensing location when the liquid product is substantially absent from the tubing preceding the sensing location, and (b) the inside diameter of the tubing is small enough and the material of the inside surface is selected such that air remaining in the tubing is substantially absent from the tubing at the sensing location when the liquid product is substantially present in the supply. The inside surface of the tubing and the liquid product are selected such that the liquid product forms a contact angle with the inside surface of the tubing at the sensing location of less than seventy degrees.

In another embodiment, the present invention provides a monitor for monitoring presence or absence of a liquid product in a system for pumping the liquid product from a supply to a destination. The monitor has a pump and associated tubing coupled between the supply and the pump and between the pump and the destination. A capacitive sensor is coupled to the outside of the tubing at a sensing location between the pump and the destination, the capacitive sensor being responsive to the presence or absence of the liquid product in the tubing. The tubing is selected from a material and having an inside diameter at the sensing location selected such that (a) the material of the inside surface of the tubing and the inside diameter of the tubing is large enough such that the liquid product is substantially evacuated from the tubing at the sensing location when the liquid product is substantially absent from the tubing preceding the sensing location, and (b) the inside diameter of the tubing is small enough and the material of the inside surface is selected such that air remaining in the tubing is substantially absent from the tubing at the sensing location when the liquid product is substantially present in the supply. The inside surface of the tubing and the liquid product are selected such that the liquid product forms a contact angle with the inside surface of the tubing at the sensing location of less than seventy degrees.

In another embodiment, the present invention provides a method of monitoring presence or absence of a liquid product in a system for pumping the liquid product from a supply through a pump and associated tubing to a destination, the tubing having an inside surface at a sensing location and having a volume within the tubing at the sensing location. The inside surface of the tubing is selected from a material, an inside diameter of the tubing is selected and the liquid product is selected such that (a) the liquid product forms a contact angle with the inside surface of the tubing at the sensing location of less than seventy degrees, (b) the material of the inside surface of the tubing and the inside diameter of the tubing is large enough such that the liquid product is substantially evacuated from the tubing at the sensing location when the liquid product is substantially absent from the tubing preceding the sensing location, and (c) the inside diameter of the tubing is small enough and the material of the inside surface is selected such that air remaining in the tubing is substantially absent from the tubing at the sensing location when the liquid product is substantially present in the supply. A capacitive sensor is coupled to the outside of the tubing at the sensing location between the pump and the destination, the capacitive sensor being responsive to the presence or absence of the liquid product in the tubing.

In a preferred embodiment, the longitudinal direction of the tubing at the sensing location is other than horizontal.

In a preferred embodiment, the longitudinal direction of the destination tubing at the sensing location is substantially vertical.

In a preferred embodiment, the viscosity of the liquid product and forces between the liquid product, the inside surface of the tubing and air prevents bunching of less than one half inch (1.27 centimeters) spacing of the liquid product in the tubing even though the liquid product is substantially absent from the tubing preceding the sensing location.

In a preferred embodiment, air forms less than twenty-five percent of the volume in the tubing at the sensing location when the liquid product is substantially present in the tubing preceding the sensing location.

In still another embodiment, the present invention provides, a monitor for monitoring presence or absence of a liquid product in a system for pumping the liquid product from a supply through a pump and associated tubing to a destination. A capacitive sensor is coupled to the outside of the tubing at a sensing location between the supply and the pump, the capacitive sensor being responsive to the presence or absence of the liquid product in the tubing. The tubing is selected from a material and having an inside diameter at the sensing location selected such that (a) the material of the inside surface of the tubing and the inside diameter of the tubing is large enough such that the liquid product substantially drains from the tubing at the sensing location when the liquid product is substantially absent from the tubing preceding the sensing location, and (b) the inside diameter of the tubing is small enough and the material of the inside surface is selected such that the liquid product is substantially evacuated by pumping from the tubing at the sensing location when the liquid product is substantially absent from the tubing preceding the sensing location. The inside surface of the tubing and the liquid product are selected such that the liquid product forms a contact angle with the inside surface of the tubing at the sensing location of less than seventy degrees.

In another embodiment, the present invention provides a monitor for monitoring presence or absence of a liquid product in a system for pumping the liquid product from a supply to a destination. The monitor has a pump and associated tubing coupled between the supply and the pump and between the pump and the destination. A capacitive sensor is coupled to the outside of the tubing at a sensing location between the pump and the destination, the capacitive sensor being responsive to the presence or absence of the liquid product in the tubing. The tubing is selected from a material and having an inside diameter at the sensing location selected such that (a) the material of the inside surface of the tubing and the inside diameter of the tubing is large enough such that the liquid product substantially drains from the tubing at the sensing location when the liquid product is substantially absent from the tubing preceding the sensing location, and (b) the inside diameter of the tubing is small enough and the material of the inside surface is selected such that the liquid product is substantially evacuated by pumping from the tubing at the sensing location when the liquid product is substantially absent from the tubing preceding the sensing location. The inside surface of the tubing and the liquid product are selected such that the liquid product forms a contact angle with the inside surface of the tubing at the sensing location of less than seventy degrees.

In another embodiment, the present invention provides a method of monitoring the presence or absence of a liquid product in a system for pumping the liquid product from a supply through a pump and associated tubing to a destination, the tubing having an inside surface and a volume within the tubing at the sensing location. The inside surface of the tubing is selected from a material, an inside diameter of the tubing is selected and the liquid product is selected such that (a) the liquid product forms a contact angle with the inside surface of the tubing at the sensing location of less than seventy degrees, (b) the material of the inside surface of the tubing and the inside diameter of the tubing is large enough such that the liquid product substantially drains from the tubing at the sensing location when the liquid product is substantially absent from the tubing preceding the sensing location, and (c) the inside diameter of the tubing is small enough and the material of the inside surface is selected such that the liquid product is substantially evacuated by pumping from the tubing at the sensing location when the liquid product is substantially absent from the tubing preceding the sensing location. A capacitive sensor is coupled to the outside of the tubing between the pump and the destination, the capacitive sensor being responsive to the presence or absence of the liquid product in the tubing.

In a preferred embodiment, air forms at least seventy-five percent of the volume inside of the tubing at the sensing location when the liquid product is substantially absent from the tubing preceding the sensing location.

In a still another embodiment, the present invention provides a monitor for monitoring flow of a liquid product at a sensing location in a system for pumping the liquid product in a flow direction through tubing with the sensing location having an inlet and an outlet, the tubing having an outside and an inside surface. A capacitive sensor is coupled to the outside surface of the tubing at the sensing location, the capacitive sensor being responsive to presence or absence of the liquid product in the tubing. The longitudinal direction of the tubing at the sensing location being other than horizontal with the outlet being vertically lower than the inlet. The tubing is selected from a material and having an inside diameter at the sensing location selected such that (a) the inside diameter of the tubing at the sensing location is small enough that the liquid product flowing through the tubing at the sensing location can be sensed by the capacitive sensor, (b) the inside diameter of the tubing at the sensing location is large enough that the liquid product in the tubing substantially drains from the tubing at the sensing location when the liquid product is not flowing through the tubing at the sensing location, and (c) the material of the inside surface of the tubing and the inside diameter of the tubing is large enough so that air substantially remains in the tubing at the sensing location when the liquid product is flowing through the tubing at the sensing location.

In another embodiment, the present invention provides a monitor for monitoring flow of a liquid product in a system for pumping the liquid product. The monitor has a pump and associated tubing. A capacitive sensor coupled to the outside of the tubing at a sensing location having an inlet and an outlet, the capacitive sensor being responsive to the presence or absence of the liquid product in the tubing. The longitudinal direction of the tubing at the sensing location is other than horizontal with the outlet being vertically lower than the inlet. The tubing is selected from a material and having an inside diameter at the sensing location selected such that (a) the inside diameter of the tubing at the sensing location is small enough that the liquid product flowing through the tubing at the sensing location can be sensed by the capacitive sensor, (b) the inside diameter of the tubing at the sensing location is large enough that the liquid product in the tubing substantially drains from the tubing at the sensing location when the liquid product is not flowing through the tubing at the sensing location, and (c) the material of the inside surface of the tubing and the inside diameter of the tubing is large enough so that air substantially remains in the tubing at the sensing location when the liquid product is flowing through the tubing at the sensing location.

In another embodiment, the present invention provides a method of monitoring flow of a liquid product at a sensing location having an inlet and an outlet in a system for pumping the liquid product through tubing, the tubing having a longitudinal direction along a flow path of the liquid product, the longitudinal direction of the tubing at the sensing location being other than horizontal with the outlet being vertically lower the inlet, the tubing having an outside and an inside surface, the sensing location being located between the pump and the destination. The inside surface of the tubing is selected from a material and the inside diameter of the tubing is selected such that (a) the inside diameter of the tubing at the sensing location is small enough that the liquid product flowing through the tubing at the sensing location can be sensed by the capacitive sensor, (b) the inside diameter of the tubing at the sensing location is large enough that the liquid product in the tubing substantially drains from the tubing at the sensing location when the liquid product is not flowing through the tubing at the sensing location, and (c) the material of the inside surface of the tubing and the inside diameter of the tubing is large enough so that air substantially remains in the tubing at the sensing location when the liquid product is flowing through the tubing at the sensing location. A capacitive sensor is coupled to the outside surface of the tubing at the sensing location between the pump and the destination, the capacitive sensor being responsive to the flow of the liquid product in the tubing.

In a preferred embodiment, the longitudinal direction of the tubing at the sensing location is between horizontal and vertical and wherein the capacitive sensor is coupled on the underside of the tubing at the sensing location.

In a preferred embodiment, the longitudinal direction of the tubing at the sensing location is between one degree and fifteen degrees of vertical.

In a preferred embodiment, the inside surface of the tubing at the sensing location is polytetrafluoroethylene.

In a preferred embodiment, the inside diameter of the tubing at the sensing location is larger than the inside diameter of the tubing following the sensing location.

In a preferred embodiment, the inside diameter of the tubing at the sensing location is larger than the inside diameter of the tubing preceding the sensing location.

In a preferred embodiment, the sensing location is between a pump and a destination.

DETAILED DESCRIPTION

A monitor can detect the presence, absence or flow of a liquid product being transported in tubing from a source to a destination. Examples of the source of the liquid product are a supply container, a holding tank and, simply, another tube. Examples of destinations are a tank, a machine utilizing the liquid product, such as a rinse aid product being used by a washing machine, and, simply, another tube.

While the mechanism providing the power to transport the liquid product from a source to a destination shown throughout this description is a pump, it is to be recognized and understood that other methods of powering such transport are also within the scope of the present. For example, the liquid product could be transported by the use of an aspirator. Alternatively, the liquid product may be simply gravity fed, at least with respect to the embodiments of the present invention with the monitor positioned between the "pump" and the destination. Other forms of power for transporting the liquid product are also possible although a pump, and particularly, a peristaltic pump, is the preferred form of power.

Figure 7:
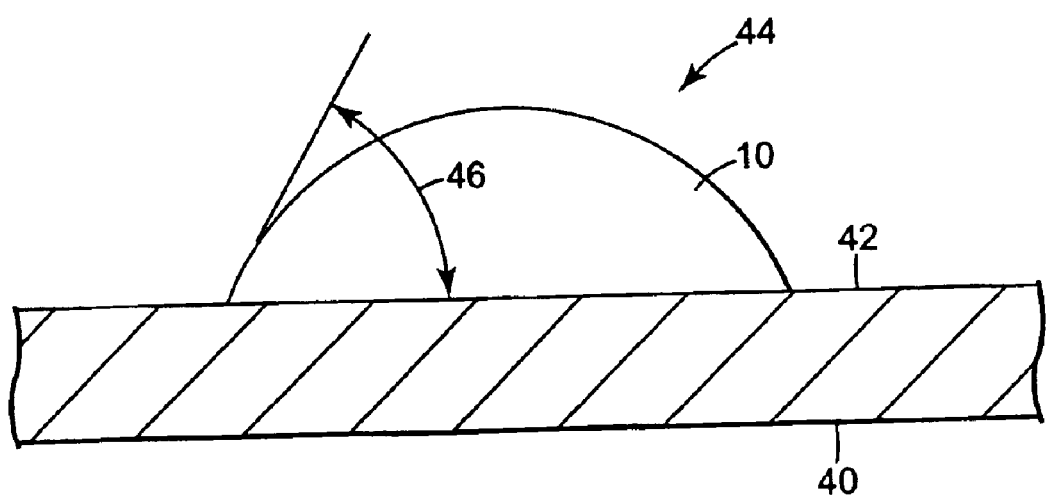
FIG. 7 illustrates a contact angle between a drop and a surface onto which the drop is formed.

In some embodiments, it is noted that it is particularly difficult to detect the absence of a liquid product through tubing when the liquid product substantially "wets" or essentially coats the inside surface of the tubing. The degree of such "wetting" or coating of the inside surface of the tubing is determined, in part, by the contact angle between the liquid product and inside surface of the tubing. The contact angle can be determined empirically and is dependent upon the liquid product and the material from which the inside surface of the tubing is constructed. FIG. 7 is illustrative of contact angle. A section of tubing 40 having an inside surface 42 which has come into contact with liquid product 10 forming a drop 44. The acute angle which drop 44 makes with inside surface 42 is the contact angle 46.

The lower the contact angle 46, the greater degree to which liquid product 10 "wets" or coats inside surface 42 of tubing 40 and the greater the problem of capacitive sensor 22 (not shown in FIG. 7) being able to detect an out-of-product condition. It has been found that with contact angles of greater than seventy degrees, generally capacitive sensors have significantly less problem in such detection. However, it has also been found that with contact angles of less than seventy degrees, and particularly, with contact angles of 64 degrees or less, capacitive sensors have a greater difficulty in such detection.

Figure 1:
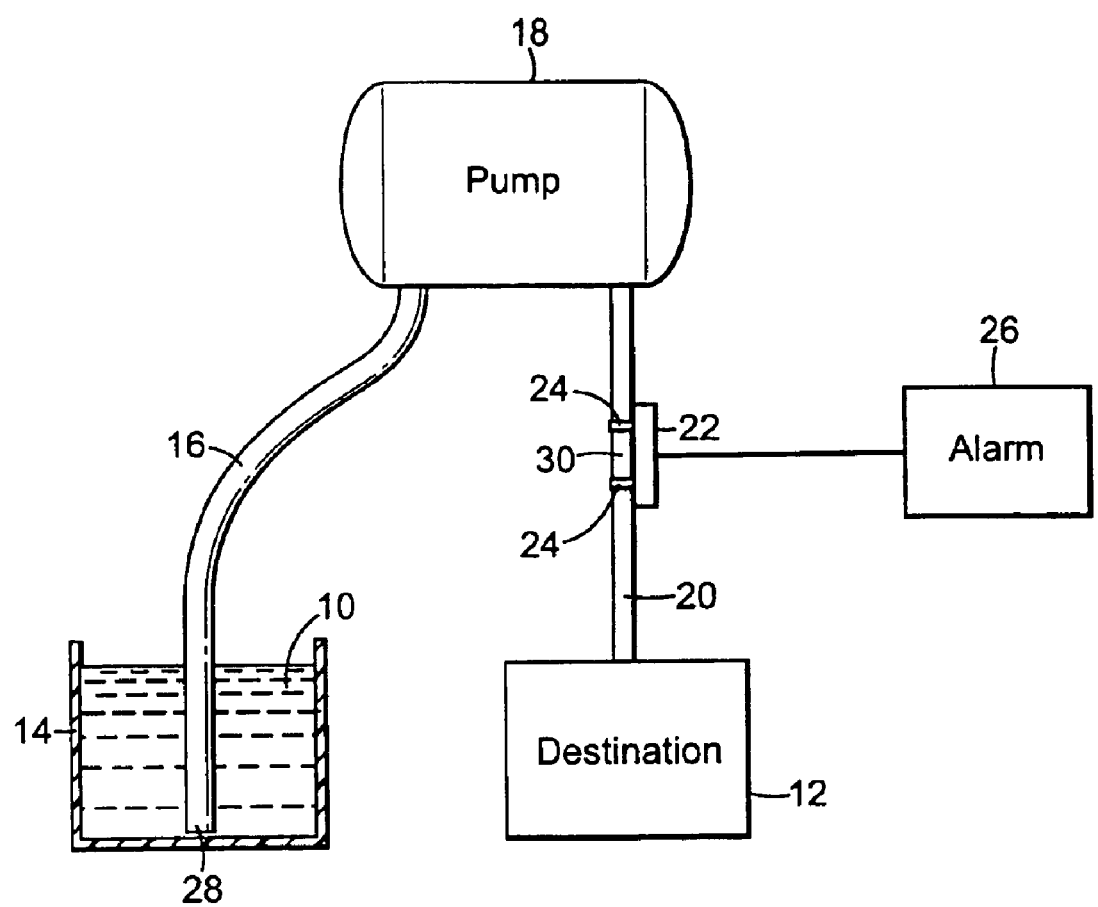
FIG. 1 is a diagram illustrating an embodiment of a capacitive sensing monitor according to the present invention with the monitor positioned between a pump and the destination.

In FIG. 1, liquid product 10 which is to be transported to destination 12 is held in supply container 14. Supply tubing 16 connects liquid product 10 in supply container 14 with pump 18. Destination tubing 20 connects pump 18 with destination 12. Capacitive sensor 22 is mounted to the exterior of destination tubing 20 at sensing location 30 by straps 24. Capacitive sensor 22 is also operably coupled to alarm module 26. Alarm module 26 is conventional and can be any of a number of things such as a visual or auditory alarm.

Connected in this manner, pump 18 draws liquid product 10 into supply tubing 16, through pump 18, and out through destination tubing 20 to destination 12. Preferably, supply tubing 16 has an end 28 positioned near the lowest point of supply container 14. Thus, when supply container 14 holds an ample amount of liquid product 10, liquid product 10 flows through supply tubing 16, pump 18 and destination tubing 20. Capacitive sensor 22, positioned on destination tubing 20 between pump 18 and destination 12, can detect the presence of liquid product flowing through destination tubing 20 and not issue an alarm.

However, when supply container 14 is about to run out of liquid product 10, liquid product 10 will no longer be able to be picked up by supply tubing 14. Similarly, liquid product 10 will no longer be flowing into destination tubing 20. Constructed properly, any residual liquid product 10 remaining in destination tubing 20 will substantially drain out of destination tubing 20.

Without a substantial amount of liquid product 10 remaining in destination tubing 20 at sensing location 30, capacitive sensor 22 will not detect the presence of liquid product 10 and will issue an appropriate warning signal to alarm 26.

If not constructed properly, however, residual liquid product 10 may remain in destination tubing 20 at sensing location 30, be detected by capacitive sensor 22 fooling capacitive sensor 22 into thinking that liquid product 10 is still flowing through destination tubing 20 and that liquid product still exists in supply container 14. This would result in an alarm condition not being detected when; in fact, supply container 14 is substantially out of liquid product 10.

This can occur depending on the particular liquid product 10 being transported, the size of destination tubing 20, particularly the inside diameter of destination tubing 20 at sensing location 30, the material of which destination tubing 20 is made, particularly the material of the inside wall of destination tubing 20 at sensing location 30. Forces acting between liquid product 10, the inside surface material of destination tubing 20 and air can cause liquid product to bunch together and remain, in segments, in destination tubing 20 even if the supply of liquid product 10 in supply container 14 has been exhausted.

However, if the inside diameter of destination tubing 20 is too large, air will form among liquid product 10 present in destination tubing 20. If too much air is present at sensing location 30, capacitive sensor 22 will not detect the presence of liquid product 10 flowing in destination tubing 20 even though liquid product 10 is flowing and liquid product still remains in supply container 14. This would result in an erroneous out-of-product condition and result in an erroneous alarm.

It has been found that if the inside diameter of destination tubing 20 is small enough so that, in operation with liquid product flowing in destination tubing 20 at sensing location 30, air in destination tubing 20 at sensing location 30 forms less than about twenty-five percent (25%) of the volume of the inside of destination tubing 20 at sensing location 30, that capacitive sensor 22 can still reliably detect liquid product 10 and prevent an erroneous out-of-product condition.

The orientation of destination tubing 20 at sensing location 30 can also affect the performance of capacitive sensor 22 in certain conditions. Capacitive sensor 22 tends to work better if the longitudinal direction of destination tubing 20 at sensing location 30 is not horizontal. This aids in any residual liquid product 10 in draining from destination tubing. It is preferred that the longitudinal direction destination tubing 20 at sensing location 30 be substantially vertical although being vertical is not required. Other angles between not quite horizontal and vertically will also work under certain conditions.

In a preferred embodiment, liquid product 10 is a rinse aid product. In this embodiment, destination tubing 20 (at least the inside surface) is constructed of polytetrafluoroehtylene. It has been found that the preferred liquid product 10 tends to sheet off of the inside wall of destination tubing made from polytetrafluoroehtylene, thus aiding in removing residual liquid product 10 from destination tubing 20 in an out-of-product condition. Also in this embodiment, it is preferred that the inside diameter of destination tubing 20 at sensing location 30 be between one sixteenth (1/16) of an inch (1.59 millimeters) and three sixteenths (3/16) of an inch (4.76 millimeters), with one eighth (1/8) of an inch (3.18 millimeters) being preferred.

Figure 2:
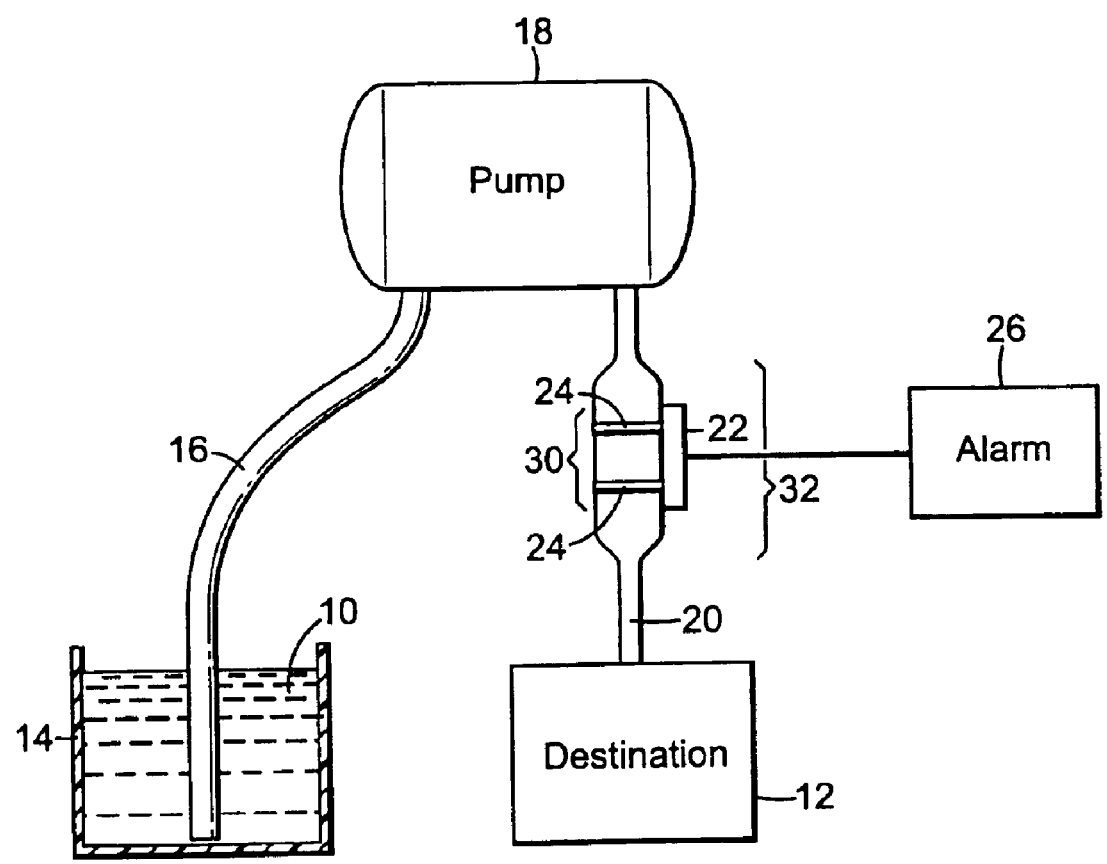
FIG. 2 is a diagram illustrating another embodiment of a capacitive sensing monitor according to the present invention with the monitor also located between a pump and the destination but with an enlarged tube section.

FIG. 2 illustrates an alternative embodiment of the present invention. The monitor system illustrated in FIG. 2 is similar to the monitor described with reference to FIG. 1 but with one important difference. Destination tubing 20 has an enlarged section 32 of tubing at sensing location 30 that is larger than destination tubing 20 following (below in the illustration, following in the flow of liquid product 10) sensing location 30. In the embodiment illustrated in FIG. 2 enlarged section 32 is also larger than destination tubing 20 before (above in the illustration, before in the flow of liquid product 10) sensing location 30. It would also work in this embodiment, although not as preferably, for one or either of the sections of destination tubing 20 either before or following sensing location 30 to be of a similar size to the size of destination tubing 20 in or at sensing location 30 as long as enlarged section 32 of destination tubing was larger than destination tubing 20 either before or following sensing location 30.

A change in size of destination tubing 20 from larger to smaller following sensing location 30 causes liquid product 10 to pool in enlarged section 32 of destination tubing 20 while liquid product is present in supply container 14 and flowing through destination tubing 20. The pooling of liquid product 10 in enlarged section 32 of destination tubing 20 helps to ensure that the presence of liquid product 10 will be properly sensed by capacitive sensor 22 when liquid product is flowing. When liquid product 10 is not present in supply container 14 or is not flowing through destination tubing 20, liquid product 10 will still drain away in enlarged section 32 of destination tubing 20 enabling capacitive sensor 22 to detect an out-of-product condition. Enlarged section 32 of destination tubing 20 also provides a larger inside diameter to help prevent liquid product 10 from bunching in destination tubing 20 at sensing location 30 when liquid product 10 is not present in supply container 14. In a preferred embodiment, enlarged section 32 of destination tubing 20 has an inside diameter of one-eighth (1/8) inch (3.18 millimeters) when the remainder of destination tubing has an inside diameter of one sixteenth (1/16) inch (1.59 millimeters).

Figure 3:
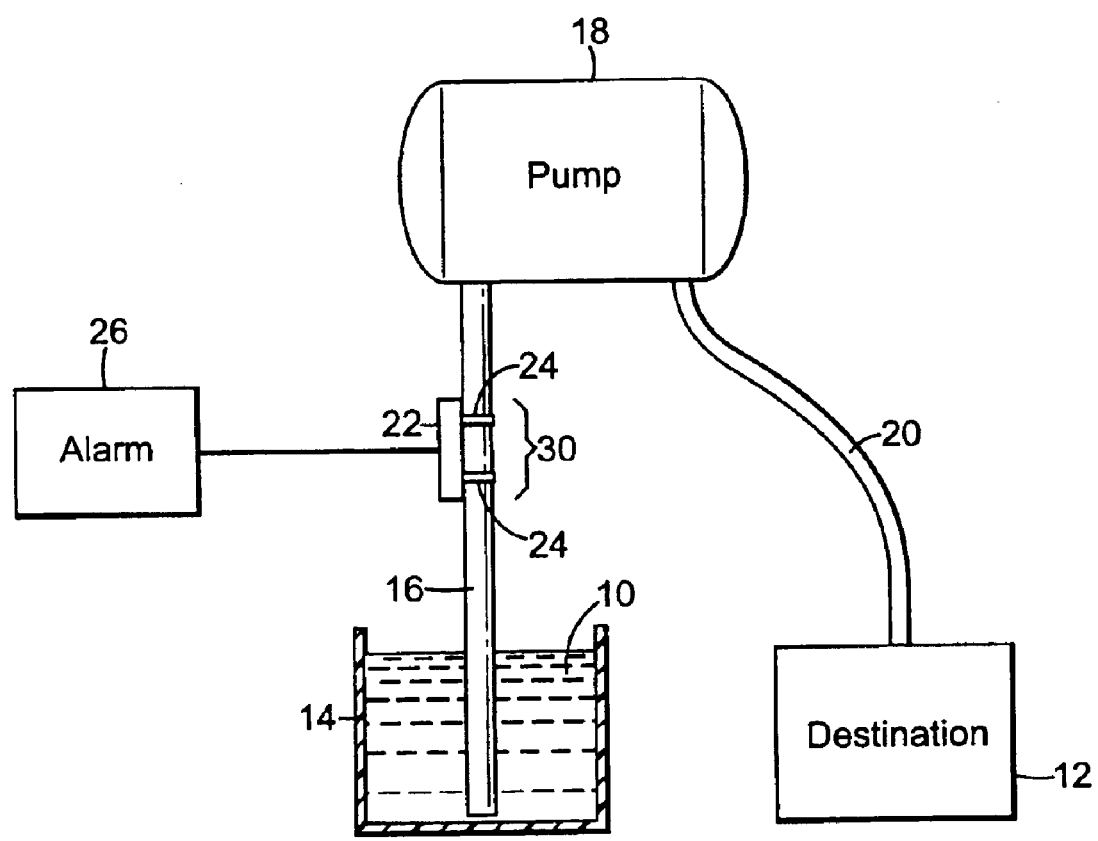
FIG. 3 is a diagram illustrating an embodiment of a capacitive sensing monitor according to the present invention with the monitor positioned between a source and a pump.

FIG. 3 illustrates another alternative embodiment of the present invention. The monitor illustrated in FIG. 3 is similar to the monitor described with reference to FIG. 1 with the exception that capacitive sensor 22 is mounted at sensing location 34 to the outside of supply tubing 16 instead of destination tubing 20 as in FIG. 1. This change of location of capacitive sensor 22 to between supply container 14 and pump 18 makes an important difference in the construction and operation of the capacitive sensing monitor. When liquid product 10 is not present in supply container 14 and pump 18 is drawing air through supply tubing 16, air bubbles may be pulled through residual liquid product 10 in supply tubing 16, and the residual liquid product 10 could prevent capacitive sensor 22 from properly detecting the absence or liquid product 10 in supply container 14. Supply tubing 16 should be sized such that pump 18 substantially evacuates residual liquid product 10 from supply tubing 16 when liquid product 10 is absent from supply container 14.

In the embodiment illustrated in FIG. 3, supply tubing 16 is preferably selected such that the material of the inside surface of supply tubing 16, the inside diameter of supply tubing 16 should be large enough that, in combination with liquid product 10, forces between liquid product 10, the inside surface of supply tubing 16 and air prevents bunching of less than one half (1/2) inch (12.7 millimeters) spacing of liquid product 10 in supply tubing 16 even though liquid product is substantially absent from supply container 14 and is not flowing in supply tubing 16. This should prevent residual liquid product 10 from sticking in supply tubing 16 at sensing location 34 to an extent that will trigger capacitive sensor 22 into believing that liquid product 10 is present when, in fact, it is not. Further, the inside diameter of supply tubing 16 preferably should be small enough and the material of the inside surface of supply material preferably should be selected such that liquid product 10 is substantially evacuated from supply tubing 16 with air forming at least seventy-five percent (75%) of the volume inside supply tubing 16 at sensing location 34 when liquid product is substantially absent from supply container 14 and is not flowing in supply tubing 16.

The orientation of supply tubing 16 at sensing location 34 can also affect the performance of capacitive sensor 22 in certain conditions. Capacitive sensor 22 tends to work better if the longitudinal direction of supply tubing 16 at sensing location 34 is not horizontal. This aids in any residual liquid product 10 in draining from supply tubing 16. If is preferred that the longitudinal direction of supply tubing 16 at sensing location 34 be substantially vertical although being vertical is not required. Other angles between not quite horizontal and vertically will also work under certain conditions.

In a preferred embodiment, liquid product 10 is a rinse aid product. Supply tubing 16 (at least the inside surface) is constructed of polytetrafluoroehtylene. It has been found that the preferred liquid product 10 tends to sheet off of the inside wall of supply tubing 16 made from polytetrafluoroehtylene, thus aiding in removing residual liquid product 10 from supply tubing 16 in an out-of-product condition. Also in this embodiment, it is preferred that the inside diameter of supply tubing 16 at sensing location 34 be between one sixteenth (1/16) of an inch (1.59 millimeters) and three sixteenths (3/16) of an inch (3.18 millimeters), with one eighth (1/8) of an inch (3.18 millimeters) being preferred.

Figure 4:
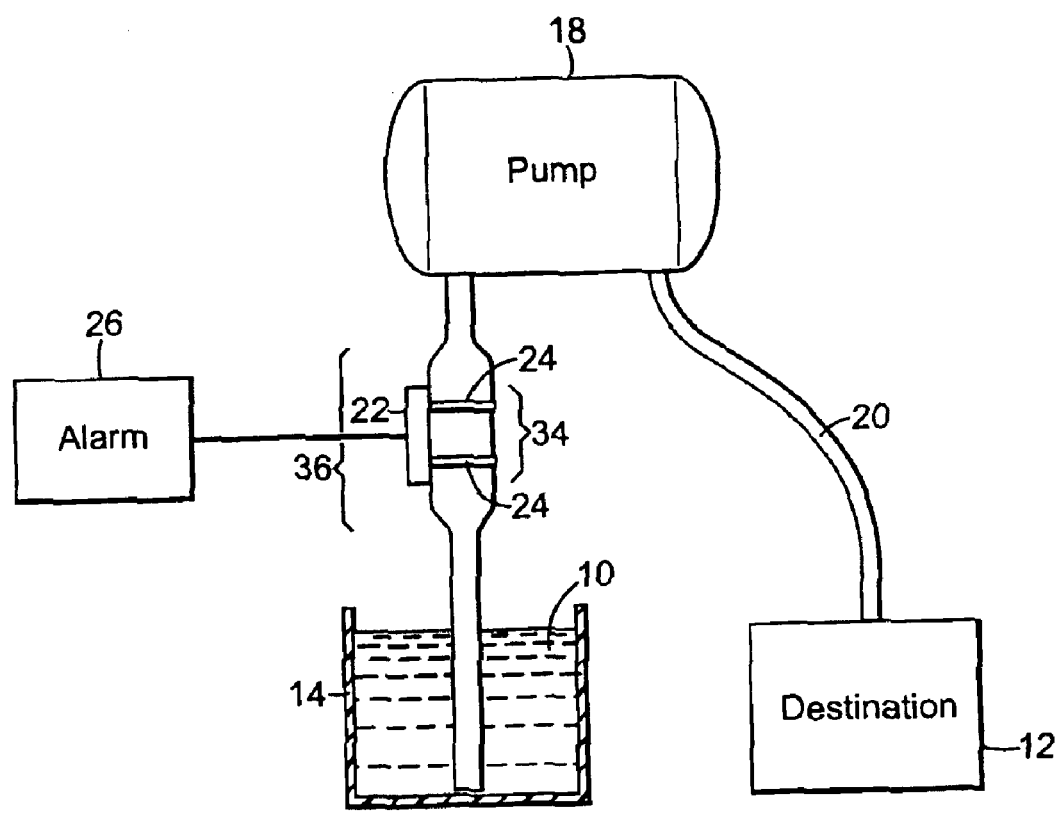
FIG. 4 is a diagram illustrating another embodiment of a capacitive sensing monitor according to the present invention with the monitor also located between a source and a pump but with an enlarged tube section.

FIG. 4 illustrates another alternative embodiment of the present invention. The monitor system illustrated in FIG. 4 is similar to the monitor described with reference to FIG. 3 but, again, with one important difference. Supply tubing 16 has an enlarged section 36 of tubing at sensing location 34 that is larger than supply tubing 16 following (above in the illustration, following in the flow of liquid product 10) sensing location 34. In the embodiment illustrated in FIG. 4 enlarged section 36 is also larger than supply tubing 16 before (below in the illustration, before in the flow of liquid product 10) sensing location 34. It would also work in this embodiment, although not as preferably, for one or either of the sections of supply tubing 16 either before or following sensing location 34 to be of a similar size to the size of supply tubing 16 in or at sensing location 34 as long as enlarged section 36 of supply tubing 16 was larger than supply tubing 16 either before or following sensing location 34.

A change in size of supply tubing 16 from smaller to larger before sensing location 34 causes liquid product 10 to pool in enlarged section 34 of supply tubing 16 while liquid product 10 is present in supply container 14 and flowing through supply tubing 16. The pooling of liquid product 10 in enlarged section 34 of supply tubing 16 helps to ensure that liquid product 10 will be properly sensed by capacitive sensor 22 when liquid product 10 is flowing. When liquid product 10 is not present in supply container 14 or is not flowing through supply tubing 16, liquid product 10 will still drain back away from enlarged section 34 of supply tubing 16 enabling capacitive sensor 22 to detect an out-of-product condition. Enlarged section 34 of supply tubing 16 also provides a larger inside diameter to help prevent liquid product 10 from bunching in supply tubing 16 at sensing location 34 when liquid product 10 is not present in supply container 14. In a preferred embodiment, enlarged section 34 of supply tubing 16 has an inside diameter of one eighth (1/8) inch (3.18 millimeters) when the remainder of supply tubing 16 has an inside diameter of one sixteenth (1/16) inch (1.59 millimeters).

In another alternative embodiment to the embodiment illustrated with respect to FIG. 1, destination tubing 20 can be selected so that an air pocket is present within destination tubing 20 at sensing location 30 even though liquid product 10 is present in supply container 14 and is flowing through destination tubing 20. In this embodiment, capacitive sensor 22 senses the presence of liquid product 10 flowing in destination tubing 20 while pump 18 is operating. When liquid product 10 is not flowing, e.g., while pump 18 is not operating or if pump 18 is malfunctioning or during an out-of-product situation, liquid product 10 is not present at sensing location 30 and capacitive sensor 22 senses that liquid product is not present. However, destination tubing 20 should not be so large that air forms enough of a percentage of the volume of the inside of destination tubing 20 at sensing location 30 that capacitive sensor 22 is unable to detect the presence of liquid product 10 when liquid product 10 is flowing. In this embodiment, destination tubing 20 should be large enough so that liquid product 10 substantially drains destination tubing 20 when liquid product 10 is not flowing. Capacitive sensor 22 can be set to be sensitive enough to detect, essentially droplets of, liquid product 10 when liquid product 10 is flowing but liquid product 10 in destination tubing 20 will quickly drain from sensing location 30 when liquid product 10 is not flowing through destination tubing 20.

Figure 5:
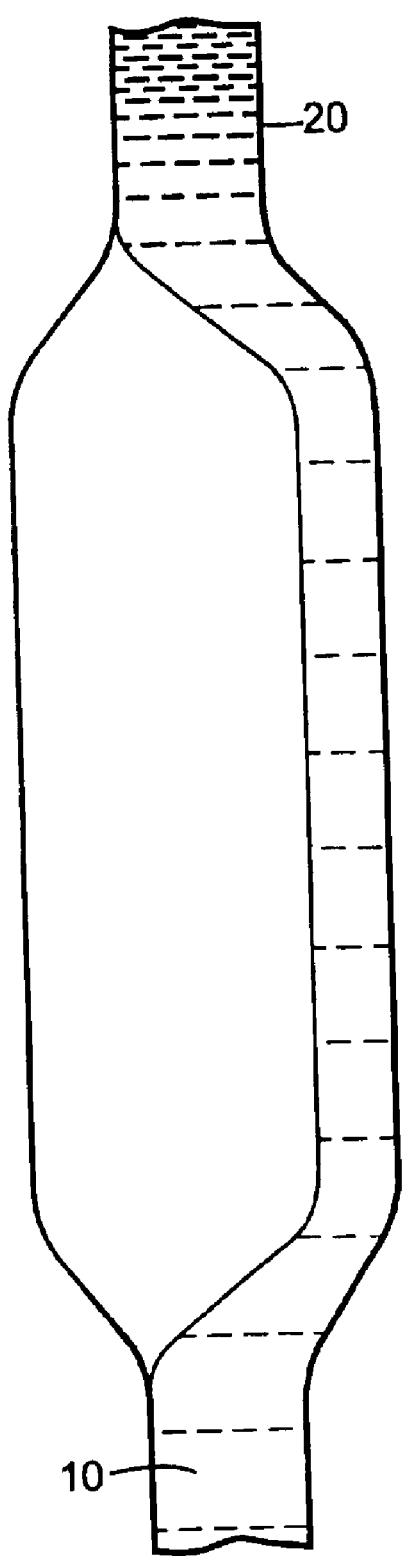
FIG. 5 is a close-up of a tubing section illustrating an alternative embodiment of the present invention with liquid product flowing the tubing.

FIG. 5 illustrates a close-up view of a section of destination tubing 20 showing liquid product 10 flowing. In the embodiment illustrated in FIG. 5, destination tubing 20 has an enlarged section 32. However, in general, this embodiment of the present invention would also be operable with tubing of constant diameter, or with an enlarged section 32 at sensing location 30 and narrower tubing 20 either before or after sensing location 30.

While a substantial air pocket is present in destination tubing 20, especially in enlarged section 32, and, in fact, there is more air present than liquid product 10, liquid product 10 still flows down the outside edge of the inside of destination tubing 20 and can still be detected by capacitive sensor 22.

Figure 6:
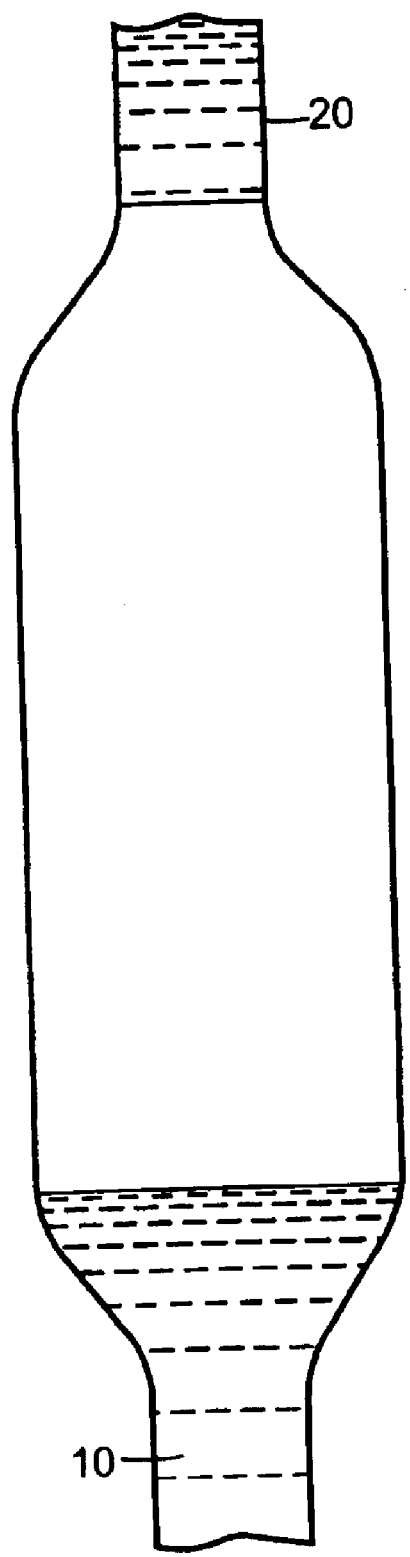
FIG. 6 is a close-up of a tubing section illustrating an alternative embodiment of the present invention with liquid product not flowing the tubing.

FIG. 6 illustrates a close-up view of destination tubing 20 of the embodiment of FIG. 5 with no liquid product 10 flowing in destination tubing 20. Note that liquid product 10 substantially drains from destination tubing 20 at sensing location 30 preventing capacitive sensor 22 from detecting liquid product 10, which would occur while pump 18 is not operating due to a malfunction or while an out-of-product situation exists.

Since this embodiment relies heavily on destination tubing 20 quickly draining of liquid product 10 once flow of liquid product 10 stops, the orientation of the longitudinal direction of destination tubing 20 is important. Since drainage is important, the longitudinal direction of destination tubing 20 should not be horizontal. Further, it is preferred that the longitudinal direction of destination tubing 20 be vertical, or at least, very close to vertical. In one embodiment, it is preferred that the angle of the longitudinal direction of destination tubing 20 be from one degree to fifteen degrees off from vertical.

Although this embodiment is illustrated with sensing location being positioned on destination tubing 20, it is to be recognized and understood that this embodiment can work equally well in situations in which the sensing location is positioned on supply tubing 16 as long as tubing is oriented such that the outlet of the tubing following sensing location 30 is positioned vertically lower than the inlet of the tubing preceding sensing location 30. In other words, the flow direction of liquid product 10 in the tubing at sensing location 30 should be in a downward direction.

Various modifications and alterations of this invention will be apparent to those skilled in the art without departing from the scope and spirit of this invention. It should be understood that this invention is not limited to the illustrative embodiments set forth above.

What is claimed is:

1. A monitor for monitoring presence or absence of a liquid product in a system for pumping said liquid product from a supply through a pump and associated tubing to a destination, comprising:
    a capacitive sensor coupled to the outside of said tubing at a sensing location between said pump and said destination, said capacitive sensor being responsive to the presence or absence of said liquid product in said tubing;
    said tubing having an inside surface at said sensing location and having a volume within said tubing at said sensing location, said tubing being selected from a material and having an inside diameter at said sensing location selected such that:
        said material of said inside surface of said tubing and said inside diameter of said tubing being large enough such that said liquid product is substantially evacuated from said tubing at said sensing location when said liquid product is substantially absent from said tubing preceding said sensing location, and
        said inside diameter of said tubing being small enough and said material of said inside surface being selected such that air remaining in said tubing is substantially absent from said tubing at said sensing location when said liquid product is substantially present in said supply;
    said inside surface of said tubing and said liquid product being selected such that said liquid product forms a contact angle with said inside surface of said tubing at said sensing location of less than seventy degrees.

2. A monitor as in claim 1 wherein said tubing has longitudinal direction along a flow path of said liquid product and wherein said longitudinal direction of said tubing at said sensing location is other than horizontal.

3. A monitor as in claim 2 wherein said longitudinal direction of said destination tubing at said sensing location is substantially vertical.

4. A monitor as in claim 1 wherein bunching of said product in said tubing is not less than one half inch (12.7 millimeters) when said liquid product is substantially absent from said tubing preceding said sensing location.

5. A monitor as in claim 1 wherein air forms less than twenty-five percent of said volume in said tubing at said sensing location when said liquid product is substantially present in said tubing preceding said sensing location.

6. A monitor as in claim 1 wherein said inside surface of said tubing at said sensing location is polytetrafluoroethylene.

7. A monitor as in claim 1 wherein said inside diameter of said tubing at said sensing location is larger than said inside diameter of said tubing following said sensing location.

8. A monitor as in claim 1 wherein said inside diameter of said tubing at said sensing location is larger than said inside diameter of said tubing preceding said sensing location.

9. A monitor for monitoring presence or absence of a liquid product in a system for pumping said liquid product from a supply to a destination, comprising:
    a pump;
    associated tubing coupled between said supply and said pump and between said pump and said destination; and
    a capacitive sensor coupled to the outside of said tubing at a sensing location between said pump and said destination, said capacitive sensor being responsive to the presence or absence of said liquid product in said tubing;
    said tubing having an inside surface at said sensing location and having a volume within said tubing at said sensing location, said tubing being selected from a material and having an inside diameter at said sensing location selected such that:
        said material of said inside surface of said tubing and said inside diameter of said tubing being large enough such that said liquid product is substantially evacuated from said tubing at said sensing location when said liquid product is substantially absent from said tubing preceding said sensing location, and
        said inside diameter of said tubing being small enough and said material of said inside surface being selected such that air remaining in said tubing is substantially absent from said tubing at said sensing location when said liquid product is substantially present in said supply;
    said inside surface of said tubing and said liquid product being selected such that said liquid product forms a contact angle with said inside surface of said tubing at said sensing location of less than seventy degrees.

10. A monitor as in claim 9 wherein said tubing has longitudinal direction and wherein said destination tubing at said sensing location is other than horizontal.

11. A monitor as in claim 10 wherein said longitudinal direction of said destination tubing at said sensing location is substantially vertical.

12. A monitor as in claim 9 wherein bunching of said product in said tubing is not less than one half inch (12.7 millimeters) when said liquid product is substantially absent from said tubing preceding said sensing location.

13. A monitor as in claim 9 wherein air forms less than twenty-five percent of said volume in said tubing at said sensing location when said liquid product is substantially present in said tubing preceding said sensing location.

14. A monitor as in claim 9 wherein said inside surface of said tubing at said sensing location is polytetrafluoroethylene.

15. A monitor as in claim 9 wherein said inside diameter of said tubing at said sensing location is larger than said inside diameter of said tubing following said sensing location.

16. A monitor as in claim 9 wherein said inside diameter of said tubing at said sensing location is larger than said inside diameter of said tubing preceding said sensing location.

17. A method of monitoring presence or absence of a liquid product in a system for pumping said liquid product from a supply through a pump and associated tubing to a destination, said tubing having an inside surface at a sensing location and having a volume within said tubing at said sensing location, comprising:
    selecting said inside surface of said tubing from a material, selecting an inside diameter of said tubing and selecting said liquid product such that:

said liquid product forms a contact angle with said inside surface of said tubing at said sensing location of less than seventy degrees;

said material of said inside surface of said tubing and said inside diameter of said tubing being large enough such that said liquid product is substantially evacuated from said tubing at said sensing location when said liquid product is substantially absent from said tubing preceding said sensing location; and said inside diameter of said tubing being small enough and said material of said inside surface being selected such that air remaining in said tubing is substantially absent from said tubing at said sensing location when said liquid product is substantially present in said supply; and coupling a capacitive sensor to the outside of said tubing at said sensing location between said pump and said destination, said capacitive sensor being responsive to the presence or absence of said liquid product in said tubing.

18. A method of monitoring as in claim 17 wherein said tubing has longitudinal direction and wherein said longitudinal direction of said tubing at said sensing location is other than horizontal.

19. A method of monitoring as in claim 18 wherein said longitudinal direction of said destination tubing at said sensing location is substantially vertical.

20. A method of monitoring as in claim 17 wherein bunching of said product in said tubing is not less than one half inch (12.7 millimeters) when said liquid product is substantially absent from said tubing preceding said sensing location.

21. A method of monitoring as in claim 17 wherein air forms less than twenty-five percent of said volume in said tubing at said sensing location when said liquid product is substantially present in said tubing preceding said sensing location.

22. A method of monitoring as in claim 17 wherein said inside surface of said tubing at said sensing location is polytetrafluoroethylene.

23. A method of monitoring as in claim 17 wherein said inside diameter of said tubing at said sensing location is larger than said inside diameter of said tubing following said sensing location.

24. A method of monitoring as in claim 17 wherein said inside diameter of said tubing at said sensing location is larger than said inside diameter of said tubing preceding said sensing location.

25. A monitor for monitoring presence or absence of a liquid product in a system for pumping said liquid product from a supply through a pump and associated tubing to a destination, comprising:

a capacitive sensor coupled to the outside of said tubing at a sensing location between said supply and said pump, said capacitive sensor being responsive to the presence or absence of said liquid product in said tubing;

said tubing having an inside surface and a volume within said tubing at said sensing location, said tubing being selected from a material and having an inside diameter at said sensing location selected such that:

said material of said inside surface of said tubing and said inside diameter of said tubing being large enough such that said liquid product substantially drains from said tubing at said sensing location when said liquid product is substantially absent from said tubing preceding said sensing location, and said inside diameter of said tubing being small enough and said material of said inside surface being selected such that said liquid product is substantially evacuated by pumping from said tubing at said sensing location when said liquid product is substantially absent from said tubing preceding said sensing location;

said inside surface of said tubing and said liquid product being selected such that said liquid product forms a contact angle with said inside surface of said tubing at said sensing location of less than seventy degrees.

26. A monitor as in claim 25 wherein said tubing has longitudinal direction along a flow path of said liquid product and wherein said longitudinal direction of said tubing at said sensing location is other than horizontal.

27. A monitor as in claim 26 wherein said longitudinal direction of said destination tubing at said sensing location is substantially vertical.

28. A monitor as in claim 25 wherein bunching of said product in said tubing is not less than one half inch (12.7 millimeters) when said liquid product is substantially absent from said tubing preceding said sensing location.

29. A monitor as in claim 25 wherein air forms at least seventy-five percent of said volume inside of said tubing at said sensing location when said liquid product is substantially absent from said tubing preceding said sensing location.

30. A monitor as in claim 25 wherein said inside surface of said tubing at said sensing location is polytetrafluoroethylene.

31. A monitor as in claim 25 wherein said inside diameter of said tubing at said sensing location is larger than said inside diameter of said tubing following said sensing location.

32. A monitor as in claim 25 wherein said inside diameter of said tubing at said sensing location is larger than said inside diameter of said tubing preceding said sensing location.

33. A monitor for monitoring presence or absence of a liquid product in a system for pumping said liquid product from a supply to a destination, comprising:

a pump;

associated tubing coupled between said supply and said pump and between said pump and said destination; and a capacitive sensor coupled to the outside of said tubing at a sensing location between said pump and said destination, said capacitive sensor being responsive to the presence or absence of said liquid product in said tubing;

said tubing having an inside surface and a volume within said tubing at said sensing location, said tubing being selected from a material and having an inside diameter at said sensing location selected such that:

said material of said inside surface of said tubing and said inside diameter of said tubing being large enough such that said liquid product substantially drains from said tubing at said sensing location when said liquid product is substantially absent from said tubing preceding said sensing location, and said inside diameter of said tubing being small enough and said material of said inside surface being selected such that said liquid product is substantially evacuated by pumping from said tubing at said sensing location when said liquid product is substantially absent from said tubing preceding said sensing location;

said inside surface of said tubing and said liquid product being selected such that said liquid product forms a contact angle with said inside surface of said tubing at said sensing location of less than seventy degrees.

34. A monitor as in claim 33 wherein said tubing has longitudinal direction and wherein said destination tubing at said sensing location is other than horizontal.

35. A monitor as in claim 34 wherein said longitudinal direction of said destination tubing at said sensing location is substantially vertical.

36. A monitor as in claim 33 wherein bunching of said product in said tubing is not less than one half inch (12.7 millimeters) when said liquid product is substantially absent from said tubing preceding said sensing location.

37. A monitor as in claim 33 wherein air forms at least seventy-five percent of said volume inside of said tubing at said sensing location when said liquid product is substantially absent from said tubing preceding said sensing location.

38. A monitor as in claim 33 wherein said inside surface of said tubing at said sensing location is polytetrafluoroethylene.

39. A monitor as in claim 33 wherein said inside diameter of said tubing at said sensing location is larger than said inside diameter of said tubing following said sensing location.

40. A monitor as in claim 33 wherein said inside diameter of said tubing at said sensing location is larger than said inside diameter of said tubing preceding said sensing location.

41. A method of monitoring presence or absence of a liquid product in a system for pumping said liquid product from a supply through a pump and associated tubing to a destination, said tubing having an inside surface and a volume within said tubing at said sensing location, comprising:
  selecting an inside surface of said tubing from a material, selecting an inside diameter of said tubing and selecting said liquid product such that:
    said liquid product forms a contact angle with an inside surface of said tubing at said sensing location of less than seventy degrees;
    said material of said inside surface of said tubing and said inside diameter of said tubing being large enough such that said liquid product substantially drains from said tubing at said sensing location when said liquid product is substantially absent from said tubing preceding said sensing location; and
    said inside diameter of said tubing being small enough and said material of said inside surface being selected such that said liquid product is substantially evacuated by pumping from said tubing at said sensing location when said liquid product is substantially absent from said tubing preceding said sensing location; and
  coupling a capacitive sensor to the outside of said tubing between said pump and said destination, said capacitive sensor being responsive to the presence or absence of said liquid product in said tubing.

42. A method of monitoring as in claim 41 wherein said tubing has longitudinal direction and wherein said longitudinal direction of said tubing at said sensing location is other than horizontal.

43. A method of monitoring as in claim 42 wherein said longitudinal direction of said destination tubing at said sensing location is substantially vertical.

44. A method of monitoring as in claim 41 wherein bunching of said product in said tubing is not less than one half inch (12.7 millimeters) when said liquid product is substantially absent from said tubing preceding said sensing location.

45. A method of monitoring as in claim 41 wherein air forms at least seventy-five percent of said volume inside of said tubing at said sensing location when said liquid product is substantially absent from said tubing preceding said sensing location.

46. A method of monitoring as in claim 41 wherein said inside surface of said tubing at said sensing location is polytetrafluoroethylene.

47. A method of monitoring as in claim 41 wherein said inside diameter of said tubing at said sensing location is larger than said inside diameter of said tubing following said sensing location.

48. A method of monitoring as in claim 41 wherein said inside diameter of said tubing at said sensing location is larger than said inside diameter of said tubing preceding said sensing location.

49. A monitor for monitoring flow of a liquid product at a sensing location in a system for pumping said liquid product through tubing in a flow direction with said sensing location having an inlet and an outlet, said tubing having an outside and an inside surface, comprising:
  a capacitive sensor coupled to said outside surface of said tubing at said sensing location, said capacitive sensor being responsive to presence or absence of said liquid product in said tubing;
  said tubing having a longitudinal direction along a flow path of said liquid product, said longitudinal direction of said tubing at said sensing location being other than horizontal with said outlet being vertically lower than said inlet;
  said tubing being selected from a material and having an inside diameter at said sensing location selected such that:
    said inside diameter of said tubing at said sensing location being small enough that said liquid product flowing through said tubing at said sensing location can be sensed by said capacitive sensor; and
    said inside diameter of said tubing at said sensing location being large enough that said liquid product in said tubing substantially drains from said tubing at said sensing location when said liquid product is not flowing through said tubing at said sensing location; and
    said material of said inside surface of said tubing and said inside diameter of said tubing being large enough so that air substantially remains in said tubing at said sensing location when said liquid product is flowing through said tubing at said sensing location.

50. A monitor as in claim 49 wherein said longitudinal direction of said tubing at said sensing location is between horizontal and vertical and wherein said capacitive sensor is coupled on the underside of said tubing at said sensing location.

51. A monitor as in claim 50 wherein said longitudinal direction of said tubing at said sensing location is between one degree and fifteen degrees of vertical.

52. A monitor as in claim 49 wherein said inside surface of said tubing at said sensing location is polytetrafluoroethylene.

53. A monitor as in claim 49 wherein said inside diameter of said tubing at said sensing location is larger than said inside diameter of said tubing following said sensing location.

54. A monitor as in claim 49 wherein said inside diameter of said tubing at said sensing location is larger than said inside diameter of said tubing preceding said sensing location.

55. A monitor as in claim 49 wherein said system pump said liquid product from a supply through a pump to a destination and wherein said sensing location is located between said pump and said destination.

56. A monitor for monitoring flow of a liquid product in a system for pumping said liquid product in a flow direction, comprising:
- a pump;
- tubing operatively coupled to said pump; and
- a capacitive sensor coupled to the outside of said tubing at a sensing location having an inlet and an outlet, said capacitive sensor being responsive to the presence or absence of said liquid product in said tubing;
- said tubing having a longitudinal direction along a flow path of said liquid product, said longitudinal direction of said tubing at said sensing location being other than horizontal with said outlet being vertically lower than said inlet;
- said tubing having an inside surface at said sensing location, having a volume within said tubing at said sensing location, said tubing being selected from a material and having an inside diameter at said sensing location selected such that:
  - said inside diameter of said tubing at said sensing location being small enough that said liquid product flowing through said tubing at said sensing location can be sensed by said capacitive sensor; and
  - said inside diameter of said tubing at said sensing location being large enough that said liquid product in said tubing substantially drains from said tubing at said sensing location when said liquid product is not flowing through said tubing at said sensing location; and
  - said material of said inside surface of said tubing and said inside diameter of said tubing being large enough so that air substantially remains in said tubing at said sensing location when said liquid product is flowing through said tubing at said sensing location.

57. A monitor as in claim 56 wherein said longitudinal direction of said tubing at said sensing location is between horizontal and vertical and wherein said capacitive sensor is coupled on the underside of said tubing at said sensing location.

58. A monitor as in claim 57 wherein said longitudinal direction of said tubing at said sensing location is between one degree and fifteen degrees of vertical.

59. A monitor as in claim 56 wherein said inside surface of said tubing at said sensing location is polytetrafluoroethylene.

60. A monitor as in claim 56 wherein said inside diameter of said tubing at said sensing location is larger than said inside diameter of said tubing following said sensing location.

61. A monitor as in claim 56 wherein said inside diameter of said tubing at said sensing location is larger than said inside diameter of said tubing preceding said sensing location.

62. A method of monitoring as in claim 61 wherein said inside diameter of said tubing at said sensing location is larger than said inside diameter of said tubing following said sensing location.

63. A method of monitoring flow of a liquid product at a sensing location having an inlet and an outlet in a system for pumping said liquid product through tubing with said tubing having a longitudinal direction along a flow path of said liquid product, said longitudinal direction of said tubing at said sensing location being other than horizontal with said outlet being vertically lower than said inlet, said tubing having an outside and an inside surface, comprising the steps of:
- selecting said inside surface of said tubing from a material and selecting an inside diameter of said tubing such that:
  - said inside diameter of said tubing at said sensing location being small enough that said liquid product flowing through said tubing at said sensing location can be sensed by said capacitive sensor; and
  - said inside diameter of said tubing at said sensing location being large enough that said liquid product in said tubing substantially drains from said tubing at said sensing location when said liquid product is not flowing through said tubing at said sensing location; and
  - said material of said inside surface of said tubing and said inside diameter of said tubing being large enough so that air substantially remains in said tubing at said sensing location when said liquid product is flowing through said tubing at said sensing location; and
- coupling a capacitive sensor to said outside surface of said tubing at said sensing location, said capacitive sensor being responsive to said flow of said liquid product in said tubing.

64. A method of monitoring as in claim 63 wherein said longitudinal direction of said tubing at said sensing location is between horizontal and vertical and wherein said capacitive sensor is coupled on the underside of said tubing at said sensing location.

65. A method of monitoring as in claim 64 wherein said longitudinal direction of said tubing at said sensing location is between one degree and fifteen degrees of vertical.

66. A method of monitoring as in claim 63 wherein said inside surface of said tubing at said sensing location is polytetrafluoroethylene.

67. A method of monitoring as in claim 63 wherein said inside diameter of said tubing at said sensing location is larger than said inside diameter of said tubing preceding said sensing location.

* * * * *